United States Patent
Fleck et al.

(10) Patent No.: US 6,260,137 B1
(45) Date of Patent: *Jul. 10, 2001

(54) DATA PROCESSING UNIT WITH DIGITAL SIGNAL PROCESSING CAPABILITIES

(75) Inventors: Rod G. Fleck; Daniel Martin, both of Mountain View, CA (US)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,764

(22) Filed: Sep. 12, 1997

(51) Int. Cl.[7] ................................ G06F 9/315
(52) U.S. Cl. ........................... 712/225; 712/224
(58) Field of Search ................. 395/393, 588, 395/598, 800.13, 800.22, 800.23, 800.24, 800.35, 800.36, 800.41, 380, 306, 316, 829; 712/217, 241, 248, 1–43, 200 T, 224, 225; 710/9; 711/1–6, 100 T

(56) References Cited

U.S. PATENT DOCUMENTS

| | | | |
|---|---|---|---|
| 4,992,934 | | 2/1991 | Portanova et al. ............ 712/209 |
| 5,269,007 | * | 12/1993 | Hanawa ....................... 712/218 |
| 5,367,705 | * | 11/1994 | Sites .......................... 710/21 |
| 5,574,928 | * | 11/1996 | White ......................... 712/23 |
| 5,721,892 | * | 2/1998 | Peleg ......................... 712/221 |
| 5,734,874 | * | 3/1998 | Van Hook ..................... 345/513 |
| 5,752,271 | * | 5/1998 | Yung ........................... 712/23 |
| 5,768,609 | * | 6/1998 | Gove et al. .................... 712/11 |
| 5,778,241 | * | 7/1998 | Bindloss et al. ................ 712/20 |
| 5,812,147 | * | 9/1998 | Van Hook ..................... 345/511 |
| 5,852,726 | * | 12/1998 | Lin et al. ..................... 712/200 |
| 5,864,713 | * | 1/1999 | Terry ......................... 395/872 |
| 5,896,543 | * | 4/1999 | Garde ......................... 712/35 |
| 5,913,054 | * | 6/1999 | Mallick et al. ................. 711/200 |
| 5,918,252 | * | 6/1999 | Chen et al. .................... 711/217 |
| 5,983,256 | * | 11/1999 | Peleg et al. ................... 708/523 |

FOREIGN PATENT DOCUMENTS

| | | | |
|---|---|---|---|
| 0 473 805 A1 | 9/1990 | (EP) | ................ G06F/9/30 |
| 0 679 991 A1 | 11/1995 | (EP) | ................ G06F/9/38 |
| WO 96/17291 | 6/1996 | (WO) | ................ G06F/9/30 |

OTHER PUBLICATIONS

Sun Microsystems, "Ultrasparc–I,–II User's manual", pp. 190–234, [retrieved on Jul. 7, 1999]. Retrieved from the Internet:<URL: http://www.sun.com/microelectronics/UltraSPARC–II/;$sessionid$2EHV1ZQAAFGW5AMUVFZE5YQ.*

Sun Microsystems, "Ultrasparc–IIi User's manual", pp.127–133, Oct. 1997.*

* cited by examiner

*Primary Examiner*—John F. Niebling
*Assistant Examiner*—Stacy Whitmore

(57) ABSTRACT

The present invention relates to a data processing unit comprising a register file, a register load and store buffer connected to the register file, a single memory, and a bus having at least first and second word lines to form a double word wide bus coupling the register load and store buffer with said single memory. The register file at least two sets of registers whereby the first set of registers can be coupled with one of the word lines and the second set of registers can be coupled with the respective other word lines, a load and store control unit for transferring data from or to the memory.

24 Claims, 6 Drawing Sheets

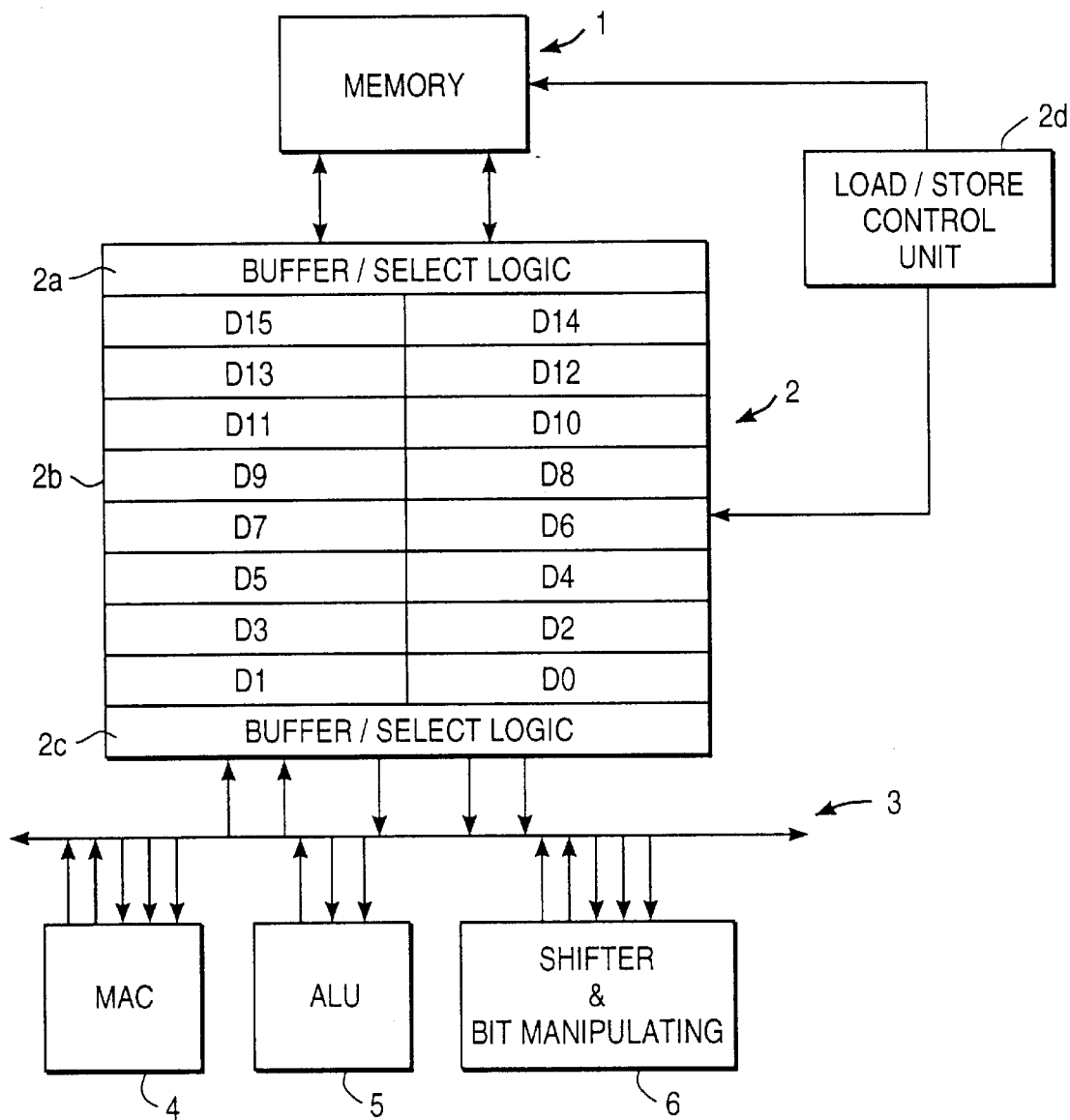
FIG_1

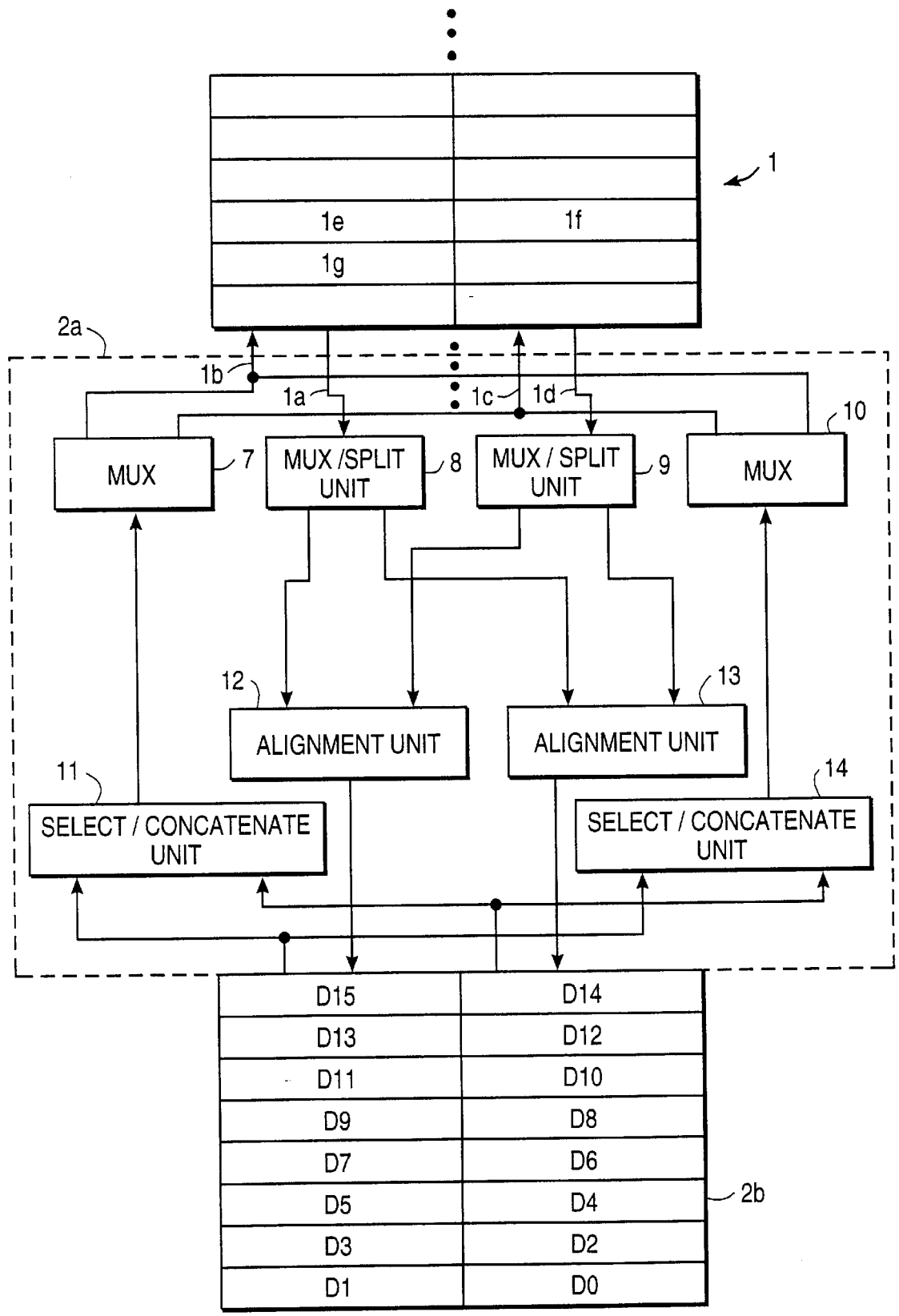
FIG_2

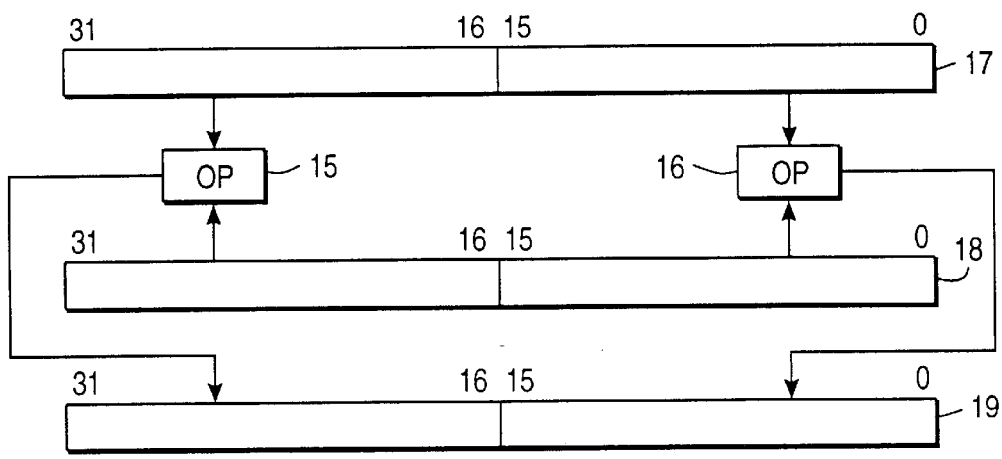
FIG_3
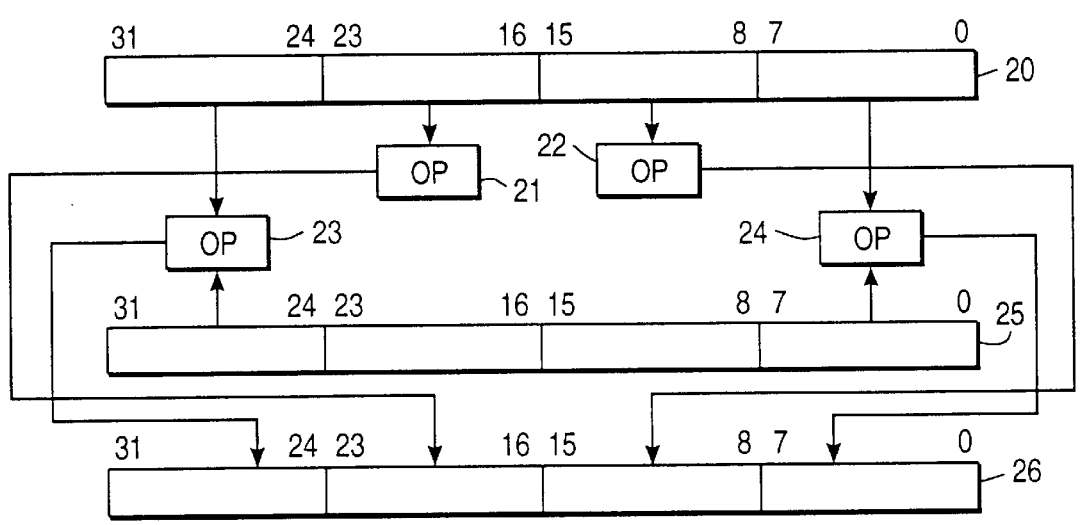
FIG_4
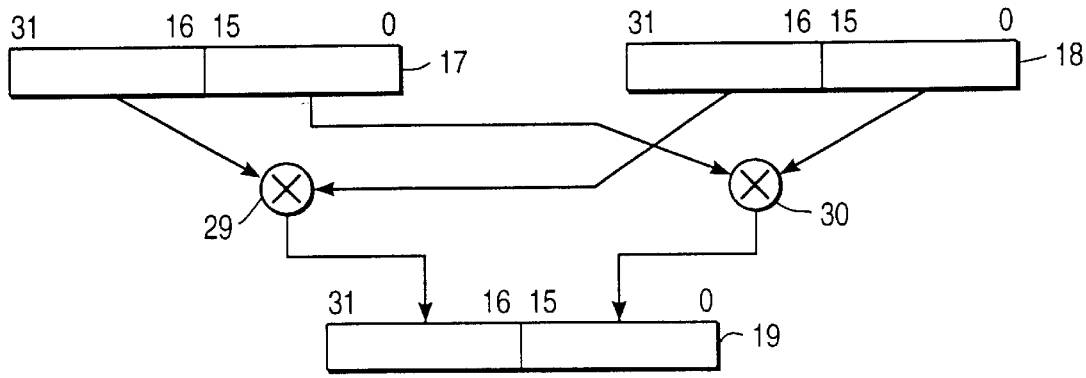
FIG_5

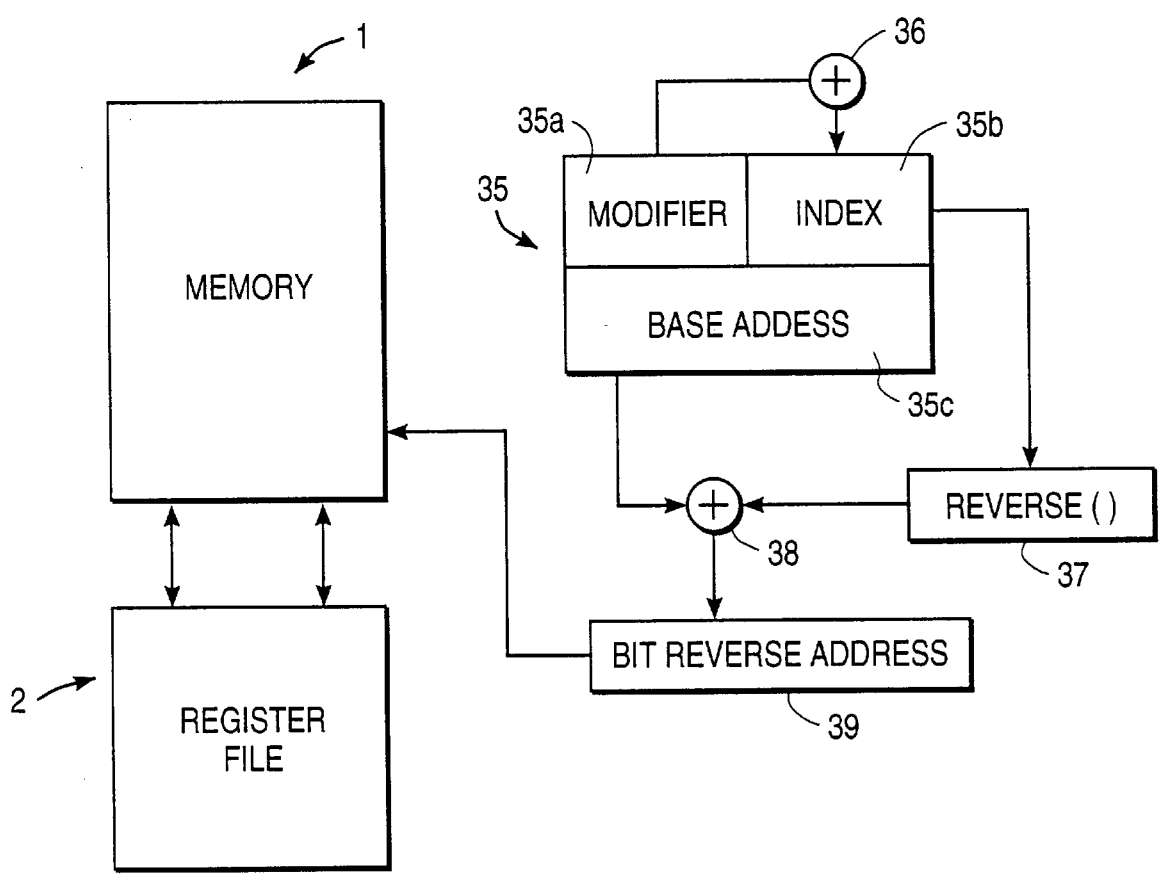
FIG_8
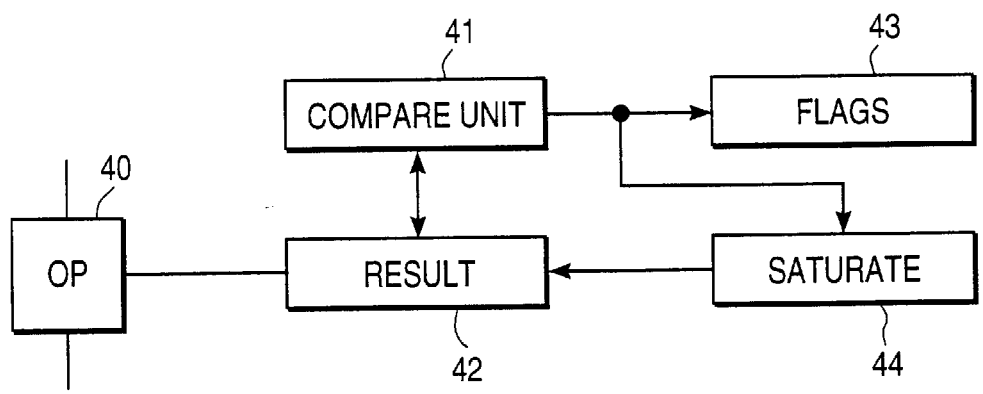
FIG_6

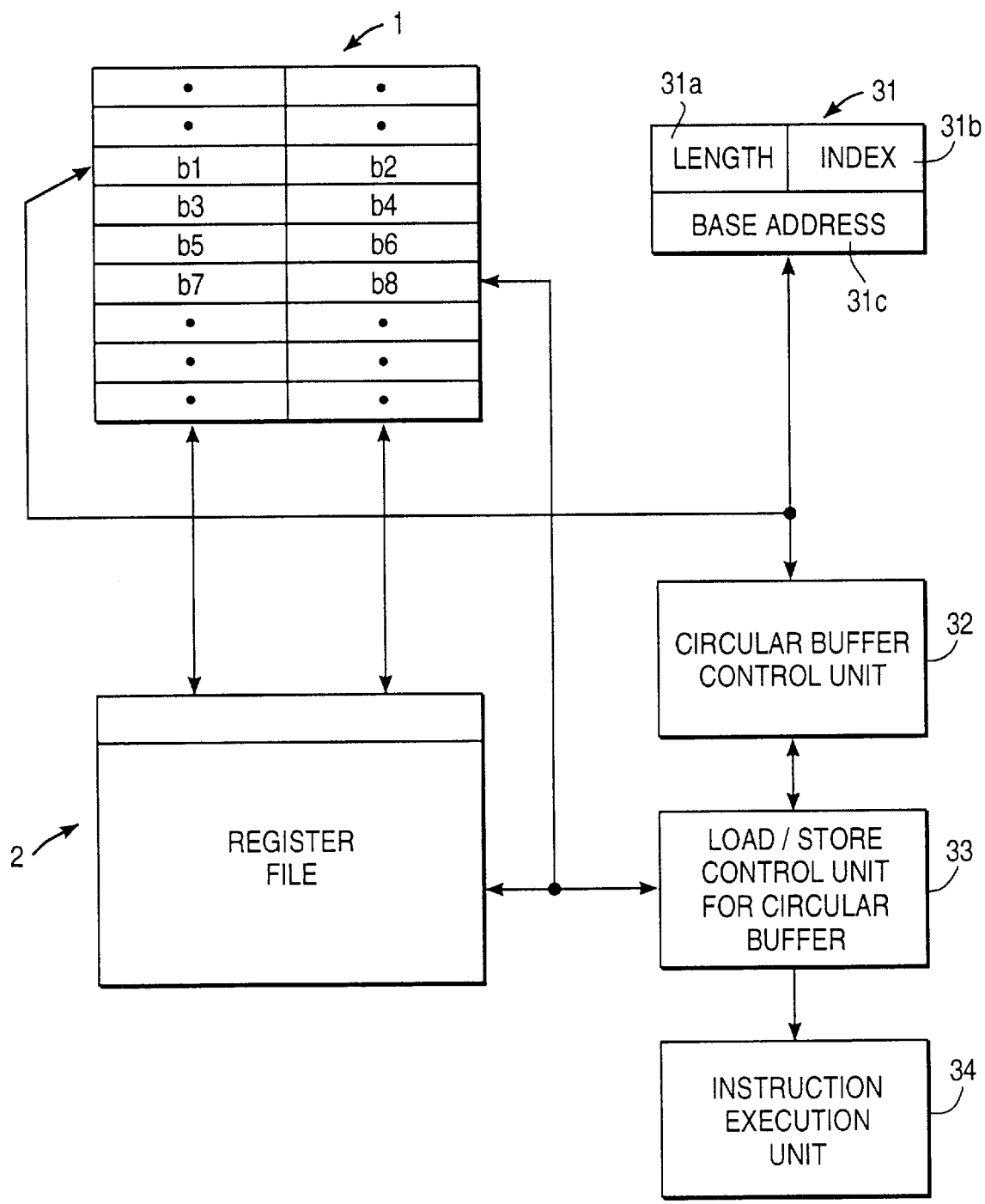
FIG_7

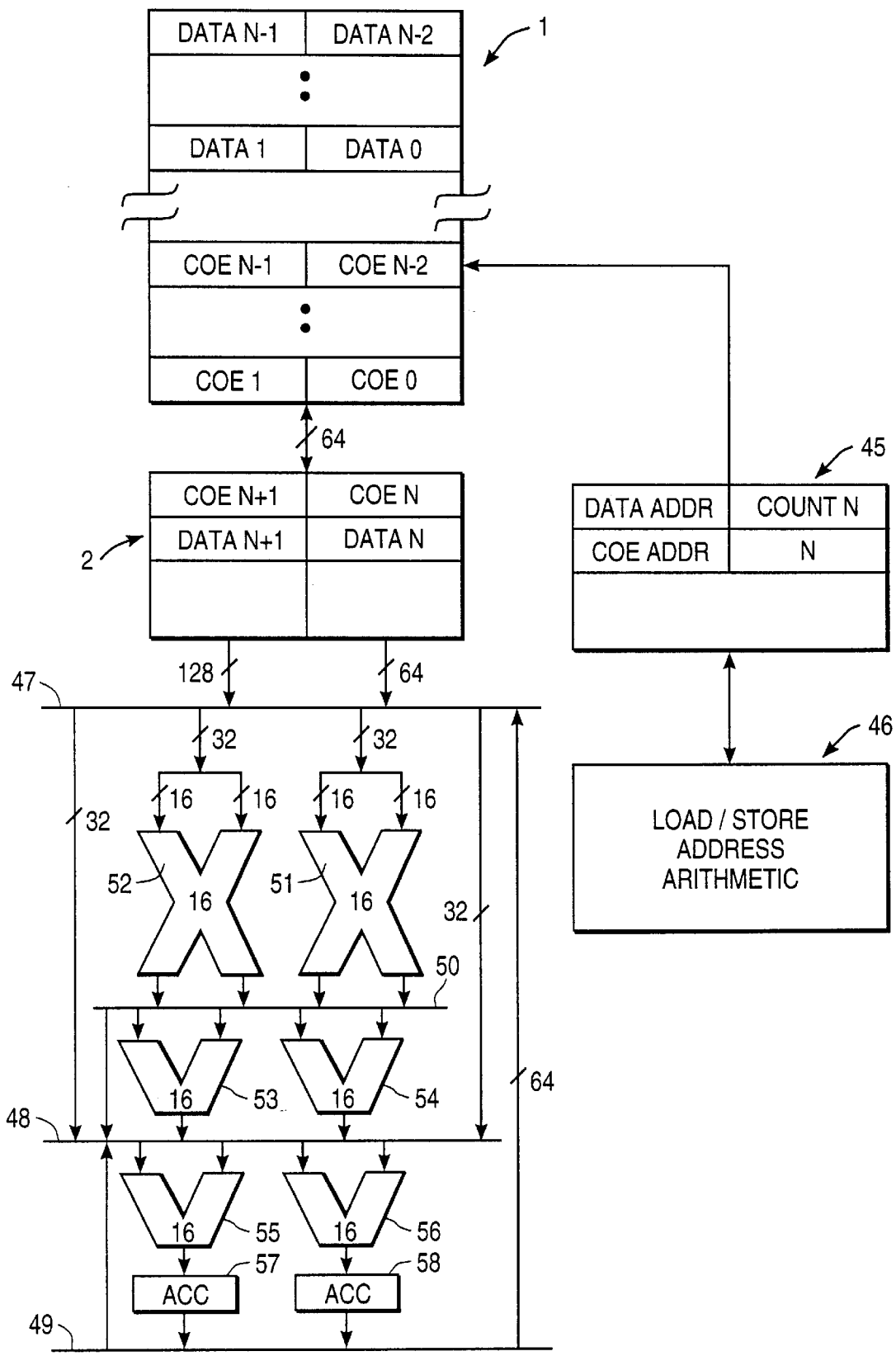
FIG_9

DATA PROCESSING UNIT WITH DIGITAL SIGNAL PROCESSING CAPABILITIES

BACKGROUND OF THE INVENTION

The present invention relates to a data processing unit and, in particular, to a central processing unit (CPU) such as a microcomputer or microcontroller. Microcontrollers are well known in the art, and a large variety of such devices from low end devices (e.g., a 4/8-bit controller) to high end devices (e.g., a 32-bit controller) are available. Generally microprocessors are divided into two groups, namely general purpose processors, such as complex instruction set computers (CISC) or reduced instruction set computers (RISC), and special microprocessors designed for special purposes, such as digital signal processing processors (DSP).

RISC and CISC processors are usually processors having a plurality of registers or a register file and a single memory of any kind and size and therefore designed to process any kind of data. RISC and CISC processors are not limited for extensions but lack the high speed processing of DSP processors.

DSP processors usually have accumulators and a special memory limited in size. They are designed to calculate data very fast and precise, for example to process sampled signals. The memory is often split into a X-memory and a Y-memory to allow access to two different data in one cycle. This results in totally non orthogonal operations, severe restrictions on addressing modes and such a memory model is definitely not compiler friendly. If specific data is in the "wrong" memory, it has to loaded from X-memory to Y-memory or vice versa. The lack of a register file makes it also difficult to program such a processor in "C". Furthermore the narrow fixed instruction width makes it impossible to extend such an architecture.

Other systems use coprocessors to speed up operation. These coprocessors do not share any register of the main central processing unit (CPU). Thus, registers of the coprocessor have to be loaded by the CPU, which slows down operation speed significantly and limits usage of registers.

SUMMARY OF THE INVENTION

Therefore, it is an object of the present invention to provide a data processor with DSP features and the versatility of CISC and RISC processors without the need of a coprocessor.

This object is accomplished by a Data processing unit comprising a register file, a register load and store buffer connected to the register file, a single memory, and a bus having at least first and second word lines to form a double word wide bus coupling the register load and store buffer with said single memory. The register file at least two sets of registers whereby the first set of registers can be coupled with one of the word lines and the second set of registers can be coupled with the respective other word lines, a load and store control unit for transferring data from or to the memory.

In one embodiment, the load and store control unit has means to load or store two consecutive words in parallel from or to said memory to or from the first and second set of registers. In another embodiment, one word from the memory can be split into two half-words which are then stored in a first register from the first set of registers and in a second register from the second set of registers. The half-words can be stored into one half of a register and the other half of the register can be filled up with zeros or sign-filled.

In a further embodiment the bus has a plurality of word lines to form a plurality-word wide bus and the register file has a plurality of sets of registers whereby each set of registers is coupled with one of word lines of said plurality of word lines. For example, in a 64 bit data processing unit, two 32 bit half-words or four 16 quarter-words can be accessed during one single cycle. The load and store control unit of the data processing can therefore have means to load or store a plurality of consecutive words in parallel from or to said memory to or from said plurality of sets of registers. These means allow to couple any register of any set of registers with any location within the memory.

In a further embodiment the load and store control unit of the data processing unit can have means to load one word from said memory and to split it into a plurality of partial-words, each partial word is stored in one of said registers of each set of registers, respectively.

A data handling unit according to the present invention has the benefit of using a standard register file with data and address register. Thus an address register can be used, for example as a stack pointer which allows unlimited stack size, whereby digital signal processors often only comprise a hardware stack which is limited in size. "C"-Code can be translated easily into machine code, allowing orthogonal operations with all registers. No constant movement of an accumulator to the memory is necessary as it is for digital signal processors. As registers can be reused, this results also in lower power consumption.

BRIEF DESCRIPTION OF THE DRAWINGS

FIG. 1 shows a basic block diagram of a register file coupled to a single memory and execution units of a data processing unit according to the present invention, FIG. 2 shows an embodiment of the connection between the register file and a single memory, FIG. 3 shows a first embodiment including operators and their link to registers of the register file, FIG. 4 shows a second embodiment including operators and their link to registers of the register file, FIG. 5 shows a third embodiment including operators and their link to registers of the register file, FIG. 6 shows the handling of flags and the saturation unit, FIG. 7 shows memory access with a circular buffer mode, FIG. 8 shows bit reversed address mode, and FIG. 9 shows an implementation of a data processing unit for executing a FIR filter function.

DESCRIPTION OF THE PREFERRED EMBODIMENT

FIG. 1 shows a basic diagram including a memory unit 1 coupled to a register file 2. Throughout the whole application a word shall mean 32 bits, a half-word shall mean 16 bits and a byte means 8 bits. Of course, the present invention is not limited to embodiments having 32 bit words, therefore a word can have any size.

For coupling the register file 2 with the memory 1, a buffer/select logic 2a is provided. In this embodiment, numeral 2b indicates the registers. 16 registers D0 to D15 are provided, whereby each register has a bit width of a word which has, for example, 32 bits. The registers are organized in two groups, even and odd registers. The registers in this example are data register but can be either address or data registers. A second set of registers can be provided in the same way for address registers. The bus between the memory unit 1 and the buffer/select logic 2a is 64 bits wide thereby two consecutive words in the memory 1 can be addressed. A load/store control unit 2d addresses the memory unit 1 and selects the respective registers 2b during a transfer from the register file 2 to the memory unit 1 or vice versa. The register file 2 comprises furthermore a second buffer/select logic 2c coupling a plurality of execution units 4, 5, and 6 thereto. A second bus 3 is provided as a link between the buffer/select logic 2c and the execution units 4, 5, and 6. Through the respective buffer/select logic 2a or 2c at least two registers, one in each group, for example, an even and an odd register, can be accessed at the same time.

FIG. 2 shows the connection between the registers 2b and the memory 1 in more detail. The memory 1 is organized in double words giving access to two consecutive words at a time, for example, to word 1e and word 1f or to word 1f and 1g. A first set of data output lines 1a, having 32 bits in this embodiment, is connected to a multiplexer/split unit 8 which couples these lines 1a through alignment units 12 or 13 either to the odd registers D1, D3, D5 . . . D15 or the even registers D2, D4, D6, . . . D14. A second set of data output lines 1d is connected to a multiplexer/split unit 9 which couples these lines 1d through alignment units 13 or 12 either to the even registers D2, D4, D6, . . . D14 or the odd registers D1, D3, D5 . . . D15. In the other direction the odd registers D1, D3, D5 . . . D15 and the even registers D2, D4, D6, . . . D14 are respectively connected to a select/concatenation unit 11 which either selects one of the register groups or concatenates half-words of each register groups to a word. The selected or concatenated word is fed to a third multiplexer 7 coupling it with either a first or second set of data input lines 1b and 1c connecting the memory 1.

The data processing unit according to the present invention supports special instructions allowing to read two data words in one cycle. Compared to a DSP having two separate memory units, the data processing unit according to the invention has a single memory unit. DSP with two memory have to transfer data from one memory to the other if it is stored in the "wrong" memory. This is not necessary with a data processing unit according to the present invention. The access to two data words is only limited insofar, that the data words must be stored in consecutive order. On the other hand using only one single memory provides the data processing unit with all the advantages and the versatility of a RISC or CISC processor. Thus, data can be stored anywhere in the memory, which is very convenient, for example, for "C"-programming.

The special instructions provide a "load double word to a register"-instruction. The double word is loaded from the memory to the multiplexer units 8 and 9 through the data output lines 1a and 1d. In this mode units 12 and 13 operate as multiplexers coupling the data lines 1a with the odd registers or with even registers and the data lines 1d with the even registers or the odd registers, respectively. The data processing unit can have a special selecting unit allowing to select in this instruction any register in each group. A simplified embodiment selects only one register and the second register is automatically the register adjacent to the selected one. For example, if the even register D4 is the selected, the adjacent odd register would be register D5 or if the odd register D7 would be selected, the adjacent even register would be D6. The double word in the memory can be located at aligned addresses, for example word 1e, and consecutive word 1f, or it can be accessed at unaligned addresses, such as word 1f and consecutive word 1g. The multiplexer 7, 8,9, and 10 align the respective data and distribute them to the respective registers or memory cells.

As mentioned, in this embodiment, the memory can be addressed with an address starting at the first data output lines 1a (aligned) or at the second data output lines 1d (unaligned). In the following the simplified embodiment is assumed. As always consecutive addresses are used, if the instruction, for example, includes a source address addressing data output lines 1a and indicating odd register D9 as the target, memory cell 1e is coupled through lines 1a and units 8 and 12 with register D9 and the consecutive memory cell 1f is coupled through lines 1d and units 9 and 13 with register D8. If the instruction includes a source address addressing data output lines 1d and indicating odd register D9 as the target, memory cell 1f is coupled through lines 1d and units 9 and 12 with register D9 and the consecutive memory cell 1g is coupled through lines 1a and units 8 and 13 with register D8. If the instruction includes a source address addressing data output lines 1a and indicating even register D2 as the target, memory cell 1e is coupled through lines 1a and units 8 and 13 with register D2 and memory cell 1f is coupled through lines 1d and units 9 and 12 with register D3. If the instruction includes a source address addressing data output lines 1d and indicating even register D2 as the target, memory cell 1f is coupled through lines 1d and units 9 and 13 with register D2 and memory cell 1g is coupled through lines 1d and units 9 and 12 with register D3. If the registers can be selected freely the coupling procedure works correspondingly.

A second type of instruction which can be executed according to the present invention is a so called "load two half-words (packed)"-instruction. With this instruction one word from either data lines 1a or 1d is loaded and split into half-words by units 8 or 9 placed in the respective lower halves of a word. Optionally units 12 and 13 can either sign-extend or zero-extend the respective half-words to words. In other words, in this embodiment, the 16 bit half-words are extended to 32 bits. Unit 8 or unit 9 splits the word received from lines 1a or 1d into two half-words and distributes them through units 12 and 13 to the lower halves of the respective even and odd registers. In units 12 and 13 these half-words can be extended to words either by filling the upper halves with zeros or by sign extending the upper halves. If the sign of a half-word is negative the upper halves of the respective register is filled up with "1" otherwise with "0". If units 12 and 13 are deactivated the half-words are stored into the lower halves of the respective even and odd registers without changing their upper halves. In a simplified version the least significant memory half-word is always stored into an even register and the most significant half-word is stored into an odd register adjacent to the even register.

A third type of instruction which can be executed according to the present invention is a so called "load two signed fractions"-instruction. With this instruction one word from either data lines 1a or 1d is loaded and split into half-words by units 8 or 9 placed in the upper halves of a respective word. Optionally units 12 and 13 can zero-extend the respective half-words to words. Unit 8 or unit 9 splits the word received from lines 1a or 1d into two half-words representing the upper and lower half of the word and distributes them through units 12 and 13 to the upper halves of the respective even and odd registers. In units 12 and 13 these half-words can be extended to words by filling the lower halves with "0". If units 12 and 13 are deactivated the half-words are stored into the upper halves of the respective even and odd registers without changing their lower halves. In a simplified version the least significant memory half-word is always stored into an even register and the most significant half-word is stored into an odd register adjacent to the even register.

A fourth type of instruction which can be executed according to the present invention is a so called "store two half-words (packed)"-instruction. With this instruction the lower half-words of an even and an odd register are fed to either concatenating unit 11 or 14. The two half-words are combined to one word and the stored in the memory unit 1 through multiplexer 7 or 10 and either data input lines 1b or 1c.

A fifth type of instruction which can be executed according to the present invention is a so called "store signed fractions"-instruction. With this instruction the upper half-words of an even and an odd register are fed to either concatenating unit 11 or 14. The two half-words are combined to one word and the stored in the memory unit 1 through multiplexer 7 or 10 and either data input lines 1b or 1c.

Finally a sixth type of instruction which can be executed according to the present invention is a so called "store double word from data registers"-instruction. With this instruction the content of an even and an odd register are fed to either multiplexer units 7 or 10 and stored in the memory unit through data input lines 1b and 1c. This instruction works in the same way as a "load double word to a register"-instruction described above. Units 7 and 10 operate as multiplexers distributing the content of each register to either data input lines 1b or 1c. Units 11 and 14 are deactivated so that units 7 and 10 each receive the full word stored in an even or odd register at their inputs.

This principle of arranging the memory and the register file can be easily extended. For example, four different sets of register can be provided and the addressing of the memory can be extended by a four word wide bus, allowing to load and store four consecutive words at a time.

Through the second buffer/select logic 2c the register file is coupled with a plurality of execution units, such as a multiplier accumulator (MAC), a arithmetic logic unit (ALU), a funnel shifter, a bit manipulation unit, etc. FIGS. 3 to 5 show how these units are connected with the register file and how they operate.

In FIG. 3 two registers 17 and 18 having 32 bits as a word are connected two operator units 15 and 16. The operator units are identical and can execute any function provided by the respective execution unit. For example, these operator units can be adders, multipliers, shifters any kind of logical units, such as comparators, AND/OR-operators, etc. As an input each operator receives a half-word, in this example 16 bit wide. Thus, the upper half of register 17 is coupled with the first input of operator unit 15 and the lower half of register 17 is coupled with the first input of operator unit 16. On the other hand, the upper half of register 18 is coupled with the second input of operator unit 15 and the lower half of register 18 is coupled with the second input of operator unit 16. The operator units comprise at least a half-word wide output. The output of operator unit 15 is coupled with the upper half of a third register 19 and the output of operator unit 16 is coupled with the lower half-word of register 19.

FIG. 4 shows a second type of packed arithmetic or logical operations. Three registers 20, 25 and 26 is divided into four parts. In this embodiment, each part contains 8 bit. Four operator units 21, 22, 23, and 24 are provided and associated to each 8 bit part of registers 20, 25 and 26. The four parts of registers 20 and 25 provide the input values for each operator unit 21, 22, 23, and 24, whereas the output signals of each operator unit 21, 22, 23, and 24 are fed to the respective parts of register 26.

FIG. 5 shows an embodiment according to FIG. 3, wherein each operator unit is a multiplier 29 and 30. The multipliers 29 and 30 can be, for example, 16 bit multipliers which produce a 32 bit result. The upper half-words of each result is the fed to the result register 19.

All registers are part of the register file and can be assigned to any even or odd register. All three registers can also be assigned to a single register. FIG. 1 shows bus 3 and the respective input and output lines which are necessary to provide the respective execution units 4, 5, and 6 with the respective input and output data.

This so called packed arithmetic or logical instructions partition, in this embodiment, a 32 bit word into several identical objects, which can then be fetched, stored, and operated on in parallel. These instructions, in particular, allow the full exploitation of the 32 bit word of the data processing unit according to the present invention in DSP applications.

In this embodiment two packed formats can be implemented. The first format divides the 32 bit word into two 16 bit half-word values. The second packed format divides the 32 bit word into four 8 bit (byte) values.

The loading and storing of packed values into data or address registers is supported by the respective load and store instructions described above. The packed objects can then be manipulated in parallel by a set of special packed arithmetic instructions that perform such arithmetic operations as addition, subtraction, multiplication, division, etc. For example a multiply instruction performs two, 16 bit multiplication's in parallel as shown in FIG. 5.

FIG. 6 shows how operations affect status flags in the CPU and how saturation of different operations can be achieved. Operator 40 writes its result into any register 42. A compare unit 41 compares the result performed by the operator and sets respective flags in flag register 43. For example, a carry bit, a overflow bit, a sticky overflow bit, an advanced overflow bit, a sticky advanced overflow bit in addition to other flags can be set. An advanced overflow bit is set when an arithmetic instruction "almost" caused an overflow, with other words compare unit compares the content of result register 42 with a predetermined value smaller than the greatest positive and/or negative number. This flag is updated every arithmetic instruction. A sticky overflow bit is set in parallel to the overflow bits. These two flag remain set until they are explicitly reset by a respective reset instruction.

Addition is performed on individual packed bytes or half-words using the respective addition instructions and they can be extended by a saturation unit 44 which ignores overflow or underflow within individual bytes or half-words. The saturation unit 44 provides each addition with a function that saturates individual bytes or half-words to the most positive value on individual overflow or to the most negative value on individual underflow. For example, compare unit 41 can compare the content of result register 42 with a predefined saturation value. If the content is greater than a predefined positive/negative saturation value, this is indicated to saturation unit 44 and saturation unit 44 sets the content of result register 42 to the respective positive or negative saturation value. Saturation can be provided to a variety of arithmetic instructions.

Many DSP-related operations need to handle a so called circular buffer. Such a buffer is usually addressed by a pointer and the CPU has to take care whenever the pointer reaches the end of the buffer to set it again to the beginning of the buffer. If the length of the circular buffer is different from any plurality of two bytes, some calculations have to be made to switch to the beginning of the circular buffer. If it has a length of $2^n$ at least one masking instruction is necessary to control access to the buffer. The data processing unit according to the present invention provides a special mechanism to support circular buffer addressing.

FIG. 7 shows memory 1 which is coupled through a double word wide bus with register file 2. The data processing unit comprises storing means 31 which store a base address 31c, a buffer length 31 a and a buffer index 31b. These parameters can be stored in a second register file containing the address registers, whereby base address 31c is stored in one address register and buffer length 31a and buffer index 31b are stored in upper and lower parts of a second address register, respectively.

A circular buffer control unit 32 is coupled with these registers 31a, 31b, and 31c. A load/store control unit for the circular buffer 33 is coupled with this control unit 32 and with the memory 1 and the register file. It also has access to the buffer storing means 31. The instruction execution unit of the CPU is indicated by numeral 34 and receives certain control inputs as will be explained later.

The primary use of circular addressing is for accessing data values in circular buffers while performing filter calculations. The base address 31c is preferably stored in an even register of the address register file which is similar to the data register file 2. Thus, parameters 31a and 31b are preferably stored in an odd address register to allow access to all parameters at the same time. The index parameter 31b can be incremented by an offset. The effective address is defined by circular buffer control unit 32 by adding the index parameter 31b to the base address parameter 31c. The circular buffer occupies memory, for example, from addresses "base address"+"uindex." Circular buffer control unit 32 increments automatically index register 31b by the accessed word size, for example by "1" for word access and by "2" for double word access or any other offset and compares the index register 31b with the length register 31a. If both are equal, the index is reset to zero. If an offset is added and the resulting index is greater than the length, the length will be subtracted from the index parameter 31b to point to the correct location (wrap around function). Thus the address mechanism automatically wraps around the circular buffer with no additional instructions.

FIG. 6 shows such a circular buffer consisting of memory cells b1, b2, . . . b8. If the circular buffer control unit starts accessing the buffer beginning with a starting index of "0", the first two cells b1 and b2 and the consecutive cells are accessed aligned, no further control action is necessary. If a starting index of, for example "1" is used, or the offset is an odd number a double word access beginning at word b8 must access word b1 as the second word. As word b1 is not consecutively stored in regard to word b8, load/store control unit 33 issues a second instruction into the instruction execution unit 34 to access word b8 during a first cycle and word b1 during the following cycle. Only in this case two access cycles are necessary to load or store data which cross the boundary of the circular buffer. As circular buffers are usually large such accesses are very rare compared to "normal" non-boundary-crossing access.

A second addressing mode, the so called bit reverse addressing, is shown in FIG. 8 and which is mostly used in Fast Fourier Transformations (FAT). Again memory 1 is coupled with register file 2 as described in the previous figures. The data processing unit comprises storing means 35 to store bit reverse parameters, such as a base address 35c, a modifier 35a, and an index 35b. All parameters are preferably stored in address registers as described in conjunction with circular buffer addressing. The base address is preferably stored in an even address register and the modifier in the upper part and the index in the lower part of a second odd address register, to allow parallel access.

The effective address is indicated by numeral 39 and automatically calculated by means of adders 36, 38 and reverse function unit 37. After an access to memory 1 the index parameter 35b is post-incremented with modifier 35a by means of adder 36. The index is fed to the reverse function unit 37 which exchanges bit n with bit (m-n) for n=0, . . . , m; whereby m indicates the length of the index parameter 35b. The function executed by unit 37 is simply mirroring the content of the index register 35b at the center of the register. In a 16 bit register with bits 0, . . . , 15 the center would be between bit 7 and 8. The reversed index parameter is fed to adder 38 which adds it to the base address 35c. The result 39 is used as the address for memory 1 and if necessary transformed to the physical address of the respective memory cell.

To illustrate, using a 1024 point real FFT with 16 bit values, then the buffer size is 2048 bytes. Stepping through this array using a bit reverse index would give the sequence of byte indices: 0, 1024, 512, 1536, 256 . . . . This sequence can be obtained by initializing the index 35b to 0 and the modifier to 0x0020.

In general, the value of the modifier required is given by the reverse function of the buffer size/2, where the buffer size is given in bytes. This mechanism saves execution time and memory space. It also makes a FFT-Algorithm much easier to write. Without a bit reversed addressing mode it would take one more pass through the data to finish the FFT. The number of extra cycles required is proportional to the number of data points. The total increase in cycle count depends on the algorithm used to implement bit reverse in software.

FIG. 9 shows a block diagram showing an example of a configuration of a data handling unit according to the present invention to perform a FIR filter function. A memory 1 contains Data 0 to Data N−1 and coefficients COE 0 to COE N−1. The memory is addressed by the address register file 45 which contain respective pointers and which is coupled with a load/store address arithmetic. The memory 1 is also connected through a 64 bit bus with the data register file 2 containing actual coefficients and data which are calculated. The data processing unit comprises a plurality of buses 47, 48, 49 and 50 which handle the different data for execution in the different arithmetic units. Two multipliers 51 and 52 are provided to execute two multiplication's in parallel whose inputs are coupled with the data register file through bus 47. Furthermore two 16 bit adders 53 and 54 are provided which are coupled through bus 50 with the results of the multipliers 51 and 52. Bus 48 is coupled to the outputs of adders 53 and 54. Two additional adders 55 and 56 are provided whose inputs are coupled with bus 48 and whose outputs are coupled to bus 49. Bus 47 and therefore data register file 2 is coupled through several lines with busses 48 and 49. Bus 50 and bus 49 are additionally coupled with bus 48.

Both addressing modes can be implemented into any data processing unit independently of their memory access mechanism. As mentioned before, the present invention is not limited to any bit size. It can be implemented in a data processing unit with 16 bit word size, where a half-word is formed by 8 bits. It can also be implemented in a data processing unit with 64 bit word size, where a half-word is formed by 32 bits and a quarter-word by 16 bits.

What is claimed is:

1. Data processing unit comprising:
    a register file with a plurality of word-wide registers, whereby a word having a predefined number of bits,
    a register load and store buffer connected to said register file,
    a memory,
    a bus having at least first and second word lines to form a double word wide bus coupling said register load and store buffer with said memory, whereby said register file has at least two sets of registers,
    coupling means, so that said first set of registers can be coupled with one of said word lines and said second set of registers can be coupled with the respective other word lines,
    a load and store control unit for transferring data from or to said memory, wherein said load and store control unit is configured to, in response to a single instruction for the data processing unit, load one word from said memory and to split it into two half-words which are stored in one half of a first register from said first set of registers and in a corresponding half of a second register from said second set of registers, respectively.

2. Data processing unit according to claim 1, wherein said load and store control unit has means to load a first half-word from a first register of said first set of registers and a second half-word from a second register from said second set of registers and to concatenate both half-words to a single word and to store said word in said memory via said data bus.

3. Data processing unit according to claim 1, further comprising a saturation unit coupled with said register file for limiting the content of a register having a register length to a maximum defined by a predetermined data length being less than the register length.

4. Data processing unit according to claim 1, further comprising an arithmetic unit coupled to said register file having a plurality of equal arithmetic operators, whereby each register contains a plurality of data bytes, each arithmetic operator is fed by one of said data bytes of said register.

5. Data processing unit according to claim 1, further comprising an arithmetic unit coupled to said register file having at least two equal arithmetic operators, whereby each register contains at least two data half-words, each arithmetic operator is fed by one of said data half-words of said register.

6. Data processing unit according to claim 1, further comprising an logical unit coupled to said register file having a plurality of equal logical operators, whereby each register contains a plurality of data bytes, each logical operator is fed by one of said data bytes of said register.

7. Data processing unit according to claim 1, further comprising a logical unit coupled to said register file having at least two equal logical operators, whereby each register contains at least two data half-words, each logical operator is fed by one of said data half-words of said register.

8. Data processing unit according to claim 1, further comprising a multiply accumulator unit coupled to said register file having at least two multiply operators, whereby said registers contain at least two data half-words, the first multiply operator is fed by a first half-word of a first register and a first half-word of a second register and the second multiply operator is fed by a second half-word of a first register and a second half-word of a second register.

9. Data processing unit according to claim 1, further comprising means to define a circular buffer having buffer base address and a buffer end address in said memory.

10. Data processing unit according to claim 9, further comprising means to access a multiple-word which is partly stored at the buffer end address and partly stored at the buffer base address.

11. Data processing unit according to claim 9, wherein the buffer address and the buffer end address are stored in an address register.

12. Data processing unit according to claim 1, further comprising bit reverse addressing means having storage means for a base address, a modifier and an index, said bit reverse addressing means further comprising means to fed the index to a bit reverse unit, whose result is fed to adding means which add the result to the base address for addressing the memory and means to add after each access the modifier to the index.

13. Data processing unit according to claim 12, wherein the storage means are address register.

14. Data processing unit according to claim 1, wherein said load and store control unit has means to load or store two consecutive words in parallel from or to said memory to or from said first and second set of registers.

15. Data processing unit according to claim 1, wherein said load and store control unit has means to load or store two consecutive words in parallel from or to said memory to or from said first and second set of registers.

16. Data processing unit according to claim 1, wherein said one half of said first register is the lower half of said first register, whereby said corresponding half of said second register is therefore the lower half of said second register, and wherein said load and store control unit is further configured to sign fill the upper half of each of said first and second registers in response to said single instruction.

17. Data processing unit according to claim 1, wherein said load and store control unit is configured to fill the other half of each of said first and second registers with zeros.

18. Data processing unit comprising:
    a register file with a plurality of word-wide registers, whereby a word having a predefined number of bits,
    a register load and store buffer connected to said register file,
    a memory,
    a bus having at least first and second word lines to form a double word wide bus coupling said register load and store buffer with said memory, whereby said register file has at least two sets of registers,
    coupling means, so that said first set of registers can be coupled with one of said word lines and said second set of registers can be coupled with the respective other word lines,
    a load and store control unit for transferring data from or to said memory, wherein said load and store control unit has means to load one word from said memory and to split it into two half-words which are stored in a first register from said first set of registers and in a second register from said second set of registers, wherein said load and store control unit further comprises means to load said half-words into a lower half of a register and to sign fill the upper half of said register.

19. Data processing unit comprising:
    a register file with a plurality of word-wide registers whereby a word having a predefined number of bits,
    a register load and store buffer connected to said register file, a memory, a bus having at least first and second word lines to form a double word wide bus coupling said register load and store buffer with said memory, whereby said register file has at least two sets of registers, coupling means, so that said first set of registers can be coupled with one of said word lines and said second set of registers can be coupled with the respective other word lines, a load and store control unit for transferring data from or to said memory, wherein said load and store control unit has means to load one word from said memory and to split it into a plurality of partial-words, each partial word is stored in one of said registers of each set of registers, respectively, wherein said load and store control unit further comprises means to load said partial-words into one part of a register and to fill the remaining part of said register with zeros.

20. Data processing unit comprising:

a register file comprising a plurality of sets of word-wide registers, wherein a word has a predefined number of bits, a register load and store buffer coupled to said register file, a memory, a bus comprising a plurality of word lines to form an at least double word-wide bus coupling said register load and store buffer with said memory, a logic configured to couple a first set of registers with one of said plurality of word lines and to couple a second set of registers with another of said plurality of word lines, a load and store control unit configured to transfer data from or to said memory, wherein said load and store control unit is further configured to load one word from said memory, separate said one word into a plurality of partial words, and store said partial words into a plurality of said word-wide registers, each of said plurality of word-wide registers storing no more than one of said partial words, and said partial words each stored at a same positional portion within its respective word-wide register, whereby gaps are created in said respective word-wide registers, the gaps being portions of said respective word-wide registers other than said same positional portion.

21. Data processing unit according to claim 20, wherein said load and store control unit is configured to execute a single instruction, for the data processing unit, that instructs the data processing unit to load said one word from said memory, separate said one word into said plurality of partial words, and store said partial words into said plurality of said word-wide registers.

22. Data processing unit according to claim 20, wherein said same positional portion of any word-wide register is a lower portion of said any word-wide register, and said load and store control unit is configured to sign fill an upper portion of each of said respective word-wide registers.

23. Data processing unit according to claim 20, wherein said load and store control unit is configured to zero fill said gaps.

24. Data processing unit comprising:

a register file comprising a plurality of sets of registers, each register being at least word wide, wherein a word has a predefined number of bits, a register load and store buffer coupled to said register file, a memory, a bus comprising a plurality of word lines to form an at least double word-wide bus coupling said register load and store buffer with said memory, a logic configured to couple a first set of registers with one of said plurality of word lines and to couple a second set of registers with another of said plurality of word lines, a load and store control unit configured to transfer data from or to said memory, wherein said load and store control unit is further configured execute an instruction that instructs the data processing unit to load one word from said memory, separate said one word into a plurality of partial words, and store said partial words into a plurality of said registers wherein said instruction also instructs the data processing unit to zero fill or sign fill.

* * * * *